United States Patent
M et al.

(10) Patent No.: US 10,817,607 B1
(45) Date of Patent: Oct. 27, 2020

(54) SECURING A NETWORK DEVICE FROM MALICIOUS EXECUTABLE CODE EMBEDDED IN A COMPUTER DOCUMENT

(71) Applicant: CA, Inc., San Jose, CA (US)

(72) Inventors: Yuvaraj M, Chennai (IN); Swapan Kumar Ghosh, Paschim Medinipur (IN); Srinivasan Govindarajan, Thiruvallur (IN)

(73) Assignee: CA Inc., San Jose, CA (US)

( * ) Notice: Subject to any disclaimer, the term of this patent is extended or adjusted under 35 U.S.C. 154(b) by 290 days.

(21) Appl. No.: 15/881,048

(22) Filed: Jan. 26, 2018

(51) Int. Cl.
*G06F 21/56* (2013.01)
*G06F 21/52* (2013.01)
*G06F 21/55* (2013.01)

(52) U.S. Cl.
CPC .......... *G06F 21/566* (2013.01); *G06F 21/52* (2013.01); *G06F 21/554* (2013.01); *G06F 2221/034* (2013.01)

(58) Field of Classification Search
CPC ...... G06F 21/566; G06F 21/52; G06F 21/554; G06F 2221/034
See application file for complete search history.

(56) References Cited

U.S. PATENT DOCUMENTS

| | | | | |
|---|---|---|---|---|
| 8,516,100 B1* | 8/2013 | Oliver | ...................... | H04L 51/12 709/203 |
| 8,566,950 B1* | 10/2013 | Smith | ...................... | G06F 21/57 705/51 |
| 8,578,166 B2* | 11/2013 | De Monseignat | .. | H04L 63/0823 713/175 |
| 8,997,219 B2* | 3/2015 | Staniford | ............ | H04L 63/1416 726/22 |
| 9,239,922 B1* | 1/2016 | Zhu | ......................... | G06F 21/56 |
| 9,838,418 B1* | 12/2017 | Wardle | .................. | H04L 63/145 |
| 10,158,677 B1* | 12/2018 | DiCorpo | ............... | H04L 63/145 |
| 2003/0120947 A1* | 6/2003 | Moore | .................. | G06F 21/563 726/22 |
| 2006/0129603 A1* | 6/2006 | Park | ...................... | G06F 21/561 |

(Continued)

OTHER PUBLICATIONS

Gajek, Macro malware: dissecting a malicious Word document; May 2017, 6 Pages (Year: 2017).*

(Continued)

*Primary Examiner* — Christopher C Harris
(74) *Attorney, Agent, or Firm* — Shook, Hardy & Bacon L.L.P.

(57) ABSTRACT

Protecting a network device from malicious executable code embedded in a computer document. In one embodiment, a method may include detecting executable code embedded in a computer document stored on a network device. The method may also include detecting a potential hoax object in the computer document. The method may further include determining that the potential hoax object is a hoax object by determining that the potential hoax object includes a message enticing a user to enable execution of the executable code. The method may also include, in response to determining that the potential hoax object is a hoax object, concluding that the executable code is malicious and performing a security action on the network device that secures the network device from the malicious executable code.

20 Claims, 5 Drawing Sheets

(56) References Cited

U.S. PATENT DOCUMENTS

| | | | | |
|---|---|---|---|---|
| 2010/0064369 | A1* | 3/2010 | Stolfo | G06F 21/56 726/24 |
| 2015/0067853 | A1* | 3/2015 | Amrutkar | H04L 63/1466 726/23 |
| 2015/0363598 | A1* | 12/2015 | Xu | G06F 21/563 726/23 |
| 2016/0063247 | A1* | 3/2016 | Farjon | G06F 21/562 726/23 |
| 2018/0365429 | A1* | 12/2018 | Segal | G06F 21/577 |
| 2019/0132355 | A1* | 5/2019 | Egbert | G06F 21/566 |

OTHER PUBLICATIONS

Krahl, Using Microsoft Word to Hide Data, May 2017, Utica College, 65 Pages (Year: 2017).*

Li et al, A Study of Malcode-Bearing Documents, 2007, Springer-Verlag Berlin Heidelberg, 20 Pages (Year: 2007).*

Bindra, Masquerading as a trustworthy entity through Portable Document File (PDF) Format; 2011; IEEE, 6 Pages (Year: 2011).*

* cited by examiner

SECURING A NETWORK DEVICE FROM MALICIOUS EXECUTABLE CODE EMBEDDED IN A COMPUTER DOCUMENT

BACKGROUND

Computer documents are computer files created by a document application configured to load and modify computer documents. Examples of computer documents include word processor computer documents, spreadsheet computer documents, and presentation computer documents.

One useful feature of some document applications and computer documents is the ability to embed executable code in the computer documents. This embedded executable code may be used for a variety of tasks within the computer document and within the document application in which the computer application is loaded. For example, where the document application is a spreadsheet document application and the computer document is a spreadsheet computer document, executable code embedded in the spreadsheet computer document may be employed to keep lists of things, such as customer names, students' grades, or holiday gift ideas; perform budgeting and forecasting; analyze scientific data; create invoices and other forms; or develop charts from data.

Although allowing executable code to be embedded in computer documents may be useful, one difficulty with allowing embedded executable code in computer documents is the security risks inherent in embedded executable code. For example, when a computer document is received from a third-party, there is always a possibility that executable code embedded in the computer document may have been hacked or otherwise compromised such that the executable code has become malicious. Further, the malicious nature of malicious embedded executable code may be highly obfuscated and very difficult to detect. Thus, allowing executable code to be embedded in a computer document may result in the inadvertent execution of malicious embedded executable code once the computer document is loaded into the corresponding document application. Therefore, the benefits of allowing executable code to be embedded in a computer document may be outweighed by the security risks inherent in the use of the embedded executable code.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for protecting a network device from malicious executable code embedded in a computer document may be performed, at least in part, by a computing device comprising one or more processors. The method may include detecting executable code embedded in a computer document stored on a network device. The method may also include detecting a potential hoax object in the computer document. The method may further include determining that the potential hoax object is a hoax object by determining that the potential hoax object includes a message enticing a user to enable execution of the executable code. The method may also include, in response to determining that the potential hoax object is a hoax object, concluding that the executable code is malicious and performing a security action on the network device that secures the network device from the malicious executable code.

In some embodiments, the potential hoax object may be a text object. In these embodiments, the determining that the potential hoax object is a hoax object may be performed by searching through text in the text object to identify a word or phrase that indicates that the text object includes a message enticing a user to enable execution of the executable code.

In some embodiments, the potential hoax object may be an image object. In embodiments where the potential hoax object is an image object, the determining that the potential hoax object is a hoax object may be performed by generating a hash of the image object and determining that the hash of the image object matches a hash of a known hoax object. In these embodiments, the determining that the hash of the image object matches the hash of the known hoax object may include determining that the hash of the image object matches the hash of the known hoax object using fuzzy matching. In these embodiments, the hash of the image object may be a fuzzy hash, the hash of the known hoax object may also be a fuzzy hash, and the determining that the fuzzy hash of the image object matches the fuzzy hash of the known hoax object may include determining that the fuzzy hash of the image object matches the fuzzy hash of the known hoax object at or above a threshold matching percentage. In these embodiments, the determining that the hash of the image object matches the hash of the known hoax object may include determining that the hash of the image object matches the hash of the known hoax object using a cyclic redundancy check (CRC) to generate the hash of the image object and the hash of the known hoax object.

Alternatively, in embodiments where the potential hoax object is an image object, the determining that the potential hoax object is a hoax object may be performed by processing the image object to extract text present in the image object and searching through the extracted text to identify a word or phrase that indicates that the extracted text includes a message enticing a user to enable execution of the executable code.

In some embodiments, the computer document may be a Microsoft® Office computer document and the executable code embedded in the Microsoft® Office computer document may be Visual Basic for Applications (VBA) executable code. In these embodiments, the phrase in a potential hoax object that indicates that the potential hoax object includes a message enticing a user to enable execution of the executable code may be, or may include, the phrase "Enable Content".

In some embodiments, the computer document may be a Portable Document Format (PDF) computer document and the executable code embedded in the PDF computer document may be JavaScript executable code. In these embodiments, the phrase in a potential hoax object that indicates that the potential hoax object includes a message enticing a user to enable execution of the executable code may be, or may include, the phrase "Enable All Features".

In some embodiments, the performing of the security action on the network device may include quarantining the executable code and/or quarantining the computer document and/or ceasing the execution of the executable code.

Also, in some embodiments, one or more non-transitory computer-readable media may include one or more computer-readable instructions that, when executed by one or more processors, cause the one or more processors to perform a method for protecting a network device from malicious executable code embedded in a computer document.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

One useful feature of some document applications and computer documents is the ability to embed executable code in the computer documents. This embedded executable code may be used for a variety of tasks within the computer document and within the document application in which the computer application is loaded.

For example, where a computer document is a Microsoft® Office computer document (such as a Microsoft® Word word processor computer document, a Microsoft® Excel® spreadsheet computer document, or a Microsoft® PowerPoint® presentation computer document), Visual Basic for Applications (VBA) executable code (also known as a "Macro") may be embedded within the Microsoft® Office computer document and may be executed when the Microsoft® Office computer document is loaded into a corresponding Microsoft® Office document application (such as Microsoft® Word, Microsoft® Excel®, or Microsoft® PowerPoint®). In another example, where the computer document is a Portable Document Format (PDF) computer document, JavaScript executable code may be embedded within the PDF computer document and may be executed when the PDF computer document is loaded into a corresponding PDF document application (such as Adobe® Acrobat® Reader).

However, one difficulty with allowing embedded executable code in computer documents is the security risks inherent in embedded executable code. For example, when a computer document is received from a third-party, there is always a possibility that executable code embedded in the computer document may have been hacked or otherwise compromised such that the executable code has become malicious and exhibits malicious functionality. Malicious functionality may include, but is not limited to, functionality typical of a spyware, a virus, a worm, a logic bomb, a trapdoor, a Trojan horse, a Remote Admin Trojan (RAT), a malware, a mobile malicious code, a malicious font, or a rootkit, or some combination thereof.

Further, the malicious nature of malicious embedded executable code may be highly obfuscated and very difficult to detect. Thus, allowing executable code to be embedded in a computer document may result in the inadvertent execution of malicious embedded executable code once the computer document is loaded into the corresponding document application. Therefore, the benefits of allowing executable code to be embedded in a computer document may be outweighed by the security risks inherent in the use of the embedded executable code.

In some embodiments, methods for avoiding the execution of malicious executable code that is embedded in a computer document may include the corresponding document application prompting the user for permission prior to executing any embedded executable code. For example, Microsoft® Office document applications include a "Trust Center" feature which is configured, when a Microsoft® Office computer document with an embedded VBA executable code (i.e., a "Macro") is loaded therein, to prompt the user for permission prior to executing the embedded VBA executable code. The message in the prompt may read "SECURITY WARNING: Macros have been disabled." The user may then be presented with a button labeled "Enable Content" which allows the user to decide whether or not to select the button to allow the embedded VBA executable code to be executed. In another example, the Adobe® Acrobat® Reader document application includes a "Protected View" feature which is configured, when a PDF computer document with an embedded JavaScript executable code is loaded therein, to prompt the user for permission prior to executing the embedded JavaScript executable code. The message in the prompt may read "Protected View: This file originated from a potentially unsafe location, and most features have been disabled to avoid any potential security risks." The user may then be presented with a button labeled "Enable All Features" which allows the user to decide whether or not to select the button to allow the embedded JavaScript executable code to be executed.

Although these methods involving the document application prompting the user for permission prior to executing any embedded executable code in a computer document may be effective in some situations, purveyors of malicious embedded executable code have attempted to thwart these methods by including in the computer document itself a hoax object intended to trick the user with a visible message that entices the user to grant permission for the execution of the malicious executable code. In the VBA and JavaScript examples above, these visible messages are often effective at enticing the user to select the "Enable Content" button or the "Enable All Features" button, thus resulting in the execution of the malicious executable code that is embedded in the computer document. Therefore, hoax objects and their enticing messages are used by purveyors of malicious embedded executable code to thwart methods for avoiding the execution of malicious executable code that is embedded in a computer document.

Some embodiments disclosed herein may protect a network device from malicious executable code embedded in a computer document. For example, where a computer document stored on a network device embeds executable code, a security application disclosed herein may detect that the executable code is malicious by detecting a hoax object in the computer document that includes a visible message enticing a user to enable execution of the executable code. The security application disclosed herein may then perform, in response to detection of the hoax object, a security action on the network device that secures the network device from the malicious executable code.

For instance, in the VBA and JavaScript examples above, where a computer document stored on a network device embeds executable code, a security application disclosed herein may detect that the executable code is malicious by detecting a hoax object in the computer document that includes a visible message enticing a user to select the "Enable Content" button or the "Enable All Features" button. Then, the security application disclosed herein may perform, in response to detection of the hoax object, a security action on the network device that secures the network device from the malicious executable code, such as quarantining the embedded executable code and/or quarantining the computer document and/or ceasing the execution of the embedded executable code.

In this manner, the security application disclosed herein may enable a computer document to reap the benefits of embedding executable code in computer documents while safely handling the situation where any given embedded executable code turns out to be malicious.

Figure 1:
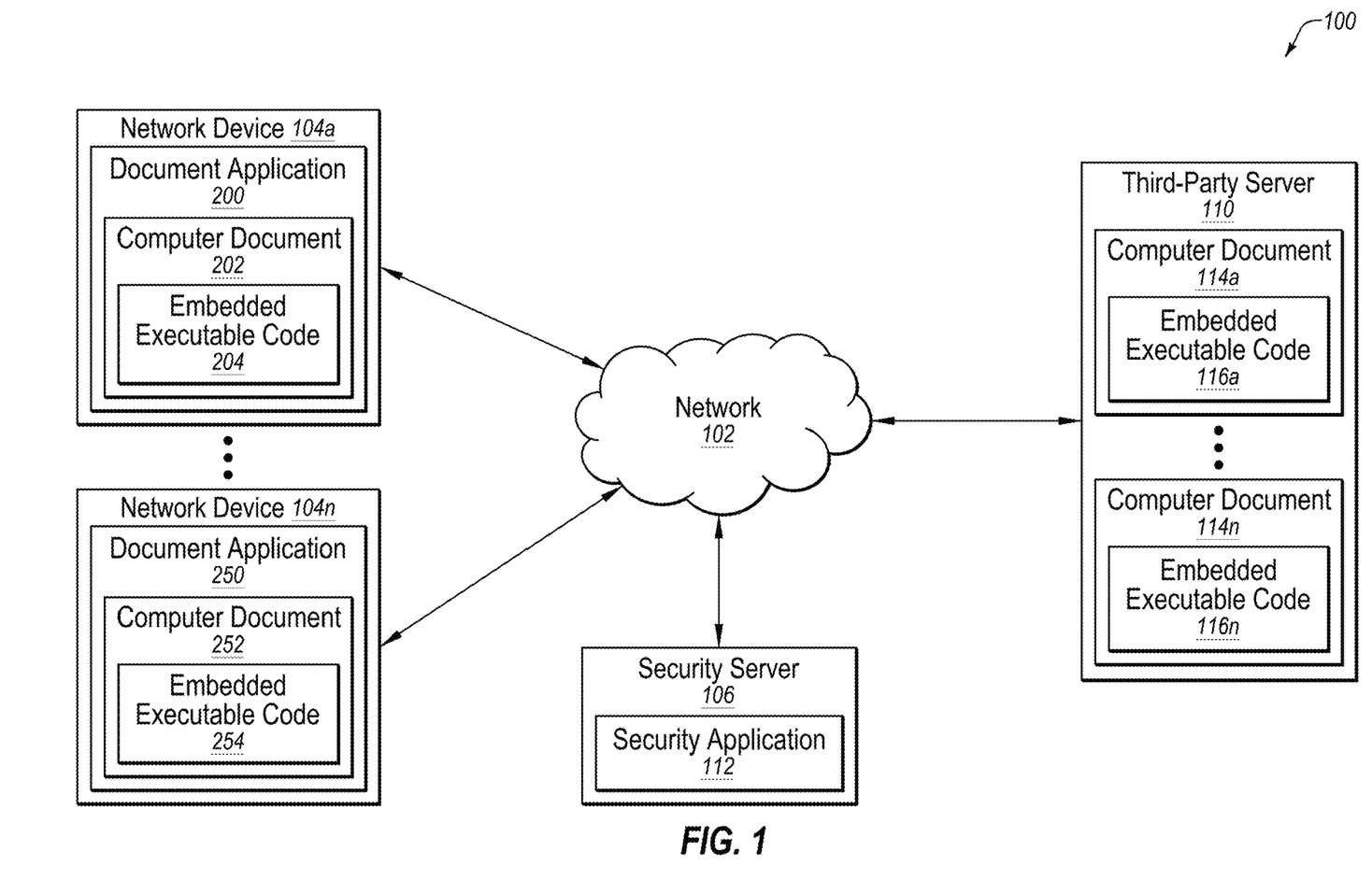
FIG. 1 illustrates an example system configured for protecting a network device from malicious executable code embedded in a computer document.

Turning to the figures, FIG. 1 illustrates an example system 100 configured for protecting a network device from malicious executable code embedded in a computer document. The system 100 may include a network 102, network devices 104a-104n, a security server 106, and a third-party server 110.

In some embodiments, the network 102 may be configured to communicatively couple the network devices 104a-104n, the security server 106, and the third-party server 110 to one another using one or more network protocols, such as the network protocols available in connection with the World Wide Web. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), the Internet, or some combination thereof. In some embodiments, the network 102 may also be coupled to, or may include, portions of a telecommunications network, including telephone lines, for sending data in a variety of different communication protocols, such as a cellular network or a Voice over IP (VoIP) network.

Figure 4:
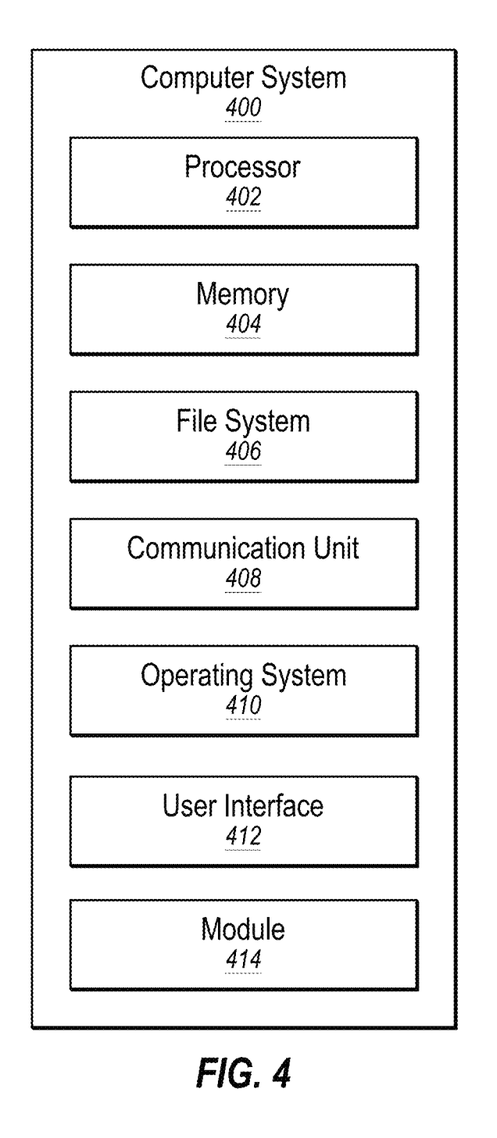
FIG. 4 illustrates an example computer system that may be employed in protecting a network device from malicious executable code embedded in a computer document.

In some embodiments, the third-party server 110 may be any computer system capable of communicating over the network 102 and capable of hosting computer documents, examples of which are disclosed herein in connection with the computer system 400 of FIG. 4. For example, the third-party server 110 may be addressable on a particular domain and may host computer documents 114a-114n. The computer documents 114a-114n may include embedded executable code 116a-116n, respectively, which may have the format of VBA or JavaScript, for example. Alternatively, the embedded executable code may have the format of another scripting language such as VBScript, AngularJS, JQuery, Bootstrap, AJAX, JScript, and ActionScript.

In some embodiments, the network devices 104a-104n may each be any computer system capable of communicating over the network 102 and executing a document application corresponding to a computer document, examples of which are disclosed herein in connection with the computer system 400 of FIG. 4. The network devices 104a and 104n may include document applications 200 and 250, respectively. The document applications 200 and 250 may be configured to load and modify computer documents 202 and 252, respectively. The computer documents 202 and 252 may include embedded executable code 204 and 254, respectively. For example, the document application 200 may be Microsoft® Word, the computer document 202 may be a Microsoft® Word word processor computer document, and the embedded executable code 204 may be an embedded VBA executable code. Similarly, the document application 250 may be Adobe® Acrobat® Reader, the computer document 252 may be a PDF computer document, and the embedded executable code 254 may be an embedded JavaScript executable code. In these examples, the computer documents 202 and 252 may have been received over the network 102 from the third-party server 110, each as an email attachment for example, and the embedded executable code 204 and 254 may be malicious due to the third-party server 110 having been hacked or having been otherwise compromised by a purveyor of malicious embedded executable code. The network devices 104a-104n also include security applications 108a-108n, respectively, that are configured to protect the network devices 104a-104n from malicious executable code embedded in computer documents, as disclosed in greater detail in connection with FIGS. 2A, 2B, and 3 herein.

In some embodiments, the security server 106 may be any computer system capable of communicating over the network 102 and capable of monitoring the network devices 104a-104n in order to secure the network devices 104a-104n from malicious executable code that is embedded in computer documents, examples of which are disclosed herein in connection with the computer system 400 of FIG. 4. In some embodiments, the security server 106 may be employed by an organization that manages and/or protects the network 102 and/or the network devices 104a-104n and/or the third-party server 110. In some embodiments, the security server 106 may include a security application 112. The security application 112 may be configured to protect the network devices 104a-104n from any malicious executable code embedded in computer documents, and may be configured to function similarly to, or to function in connection with, the security applications 108a-108n, as disclosed in greater detail in connection with FIGS. 2A, 2B, and 3 herein.

In some embodiments, the security applications 108a-108n and/or the security application 112 may include, or be part of, a network security application, such as Symantec® Endpoint Protection Mobile application or Symantec® Norton Security application.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1.

Figure 2A:
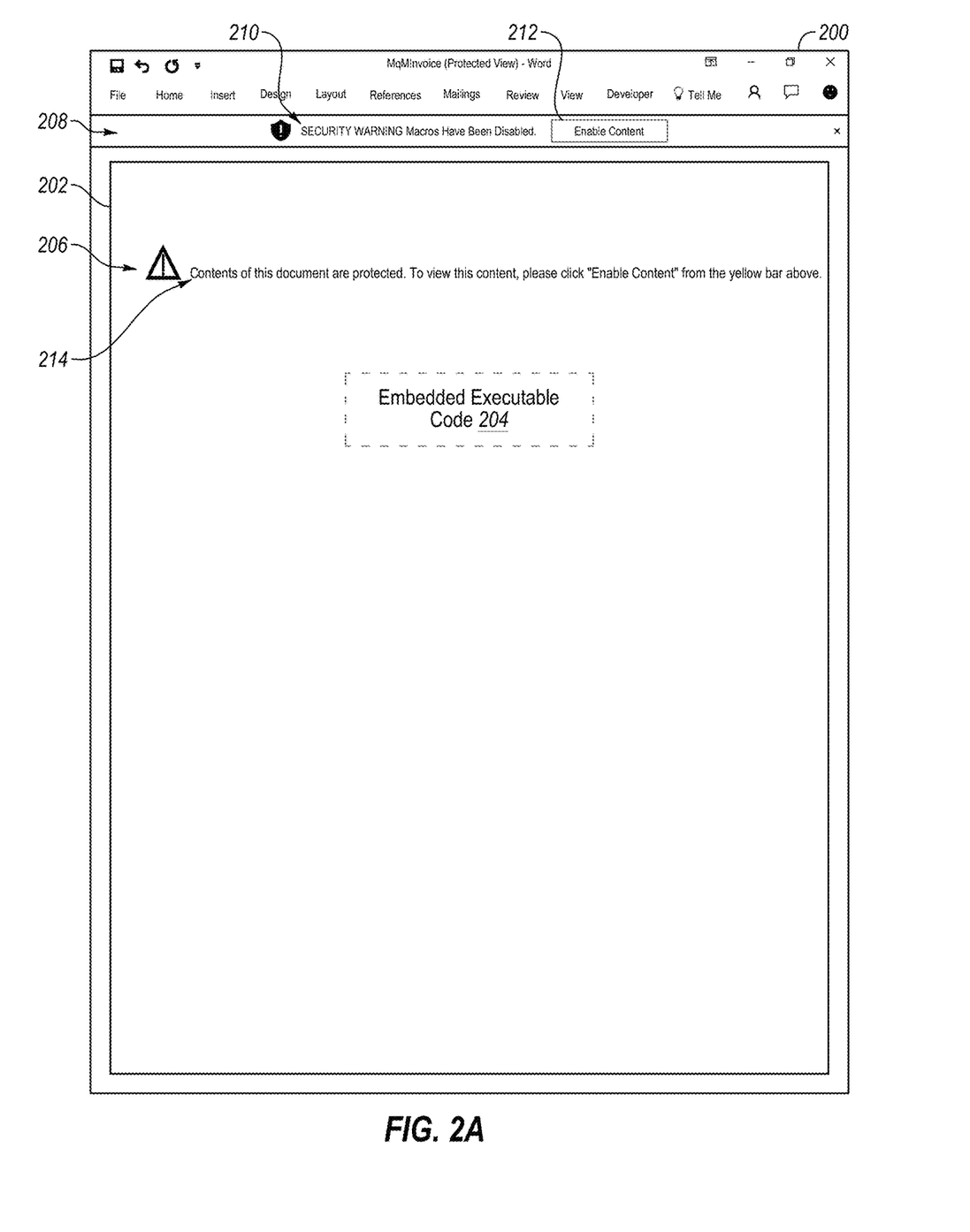
FIG. 2A illustrates an example computer document loaded into an example document application and having an example embedded executable code and an example hoax object.

FIG. 2A illustrates an example computer document 202 loaded into an example document application 200 and having an example embedded executable code 204 and an example hoax object 206. In the example disclosed in FIG. 2A, the document application 200 is Microsoft® Word, the computer document 202 is a Microsoft® Word word processor computer document, and the embedded executable code 204 is an embedded VBA executable code (i.e., a "Macro"). Although the computer document 202 is illustrated in FIG. 2A as including the embedded executable code 204, and although the document application 200 may be capable of detecting the embedded executable code 204 in the computer document 202, the embedded executable code 204 may not be visible or otherwise easily detectible by a user viewing the computer document 202.

Because the document application 200 is Microsoft® Word, the document application 200 may include a "Trust Center" feature which is configured to detect the embedded executable code 204 upon loading the computer document 202 and then present a prompt 208 to the user requesting permission prior to executing the embedded executable code 204. In this example, a message 210 in the prompt 208 may read "SECURITY WARNING: Macros have been disabled." Further, the prompt 208 may also include a button 212 labeled "Enable Content", which allows the user to decide whether or not to select the button 212 to allow the embedded executable code 204 (which, in this example, is embedded VBA executable code) to be executed.

However, in this example, the embedded executable code 204 is actually malicious, and the purveyor of the malicious embedded executable code 204 has attempted to trick and entice the user into selecting the button 212 to grant permission for the execution of the malicious embedded executable code 204 using the hoax object 206. As disclosed in FIG. 2A, the hoax object 206 is a text object (e.g., an object encoded in ASCII text, Unicode text, etc.) that includes a message 214 that reads "Contents of this document are protected. To view this content, please click 'Enable Content' from the yellow bar above."

In order to protect the network device 104a (see FIG. 1) from the malicious embedded executable code 204 that is embedded in the computer document 202, the security application 108a and/or 112 (see FIG. 1) may detect that the embedded executable code 204 is malicious by detecting the hoax object 206 in the computer document 202 that includes the message 214 enticing the user to select the "Enable Content" button 212 in order to enable execution of the malicious embedded executable code 204. The security application 108a and/or 112 (see FIG. 1) may then perform, in response to detection of the hoax object 206, a security action on the network device 104a (see FIG. 1) that secures the network device 104a from the malicious embedded executable code 204. The protection of the network device 104a (see FIG. 1) from the malicious embedded executable code 204 that is embedded in the computer document 202 is disclosed in greater detail in connection with FIG. 3 herein.

Figure 2B:
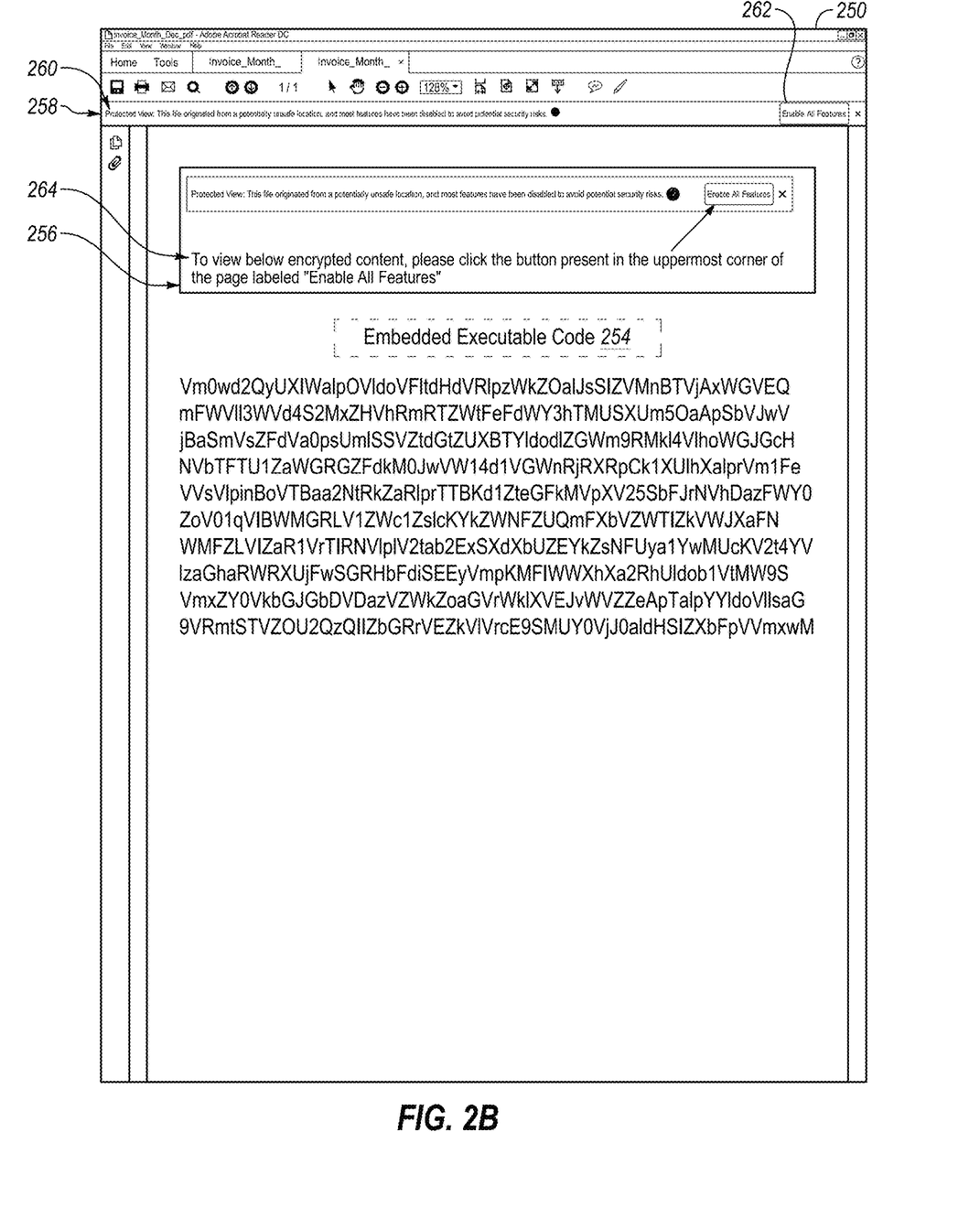
FIG. 2B illustrates another example computer document loaded into an example document application and having an example embedded executable code and an example hoax object.

FIG. 2B illustrates an example computer document 252 loaded into an example document application 250 and having an example embedded executable code 254 and an example hoax object 256. In the example disclosed in FIG. 2B, the document application 250 is Adobe® Acrobat® Reader, the computer document 252 is a PDF computer document, and the embedded executable code 254 is an embedded JavaScript executable code. Although the computer document 252 is illustrated in FIG. 2B as including the embedded executable code 254, and although the document application 250 may be capable of detecting the embedded executable code 254 in the computer document 252, the embedded executable code 254 may not be visible or otherwise easily detectible by a user viewing the computer document 252.

Because the document application 250 is Adobe® Acrobat® Reader, the document application 250 may include a "Protected View" feature which is configured to detect the embedded executable code 254 upon loading the computer document 252 and then present a prompt 258 to the user requesting permission prior to executing the embedded executable code 254. In this example, a message 260 in the prompt 258 may read "Protected View: This file originated from a potentially unsafe location, and most features have been disabled to avoid any potential security risks." Further, the prompt 258 may also include a button 262 labeled "Enable All Features", which allows the user to decide whether or not to select the button 262 to allow the embedded executable code 254 (which, in this example, is embedded JavaScript executable code) to be executed.

However, in this example, the embedded executable code 254 is actually malicious, and the purveyor of the malicious embedded executable code 254 has attempted to trick and entice the user into selecting the button 262 to grant permission for the execution of the malicious embedded executable code 254 using the hoax object 256. As disclosed in FIG. 2B, the hoax object 256 is an image object (e.g., an object encoded in JPEC, TIFF, BMP, PNG, etc.) that includes a message 264 that reads "To view the below encrypted content, please click the button present in the uppermost corner of the page labeled 'Enable All Features'." The hoax object 256 also includes an image of the "Enable All Features" button so the user can see exactly what the button 262 looks like that the message 264 is enticing the user to click.

In order to protect the network device 104n (see FIG. 1) from the malicious embedded executable code 254 that is embedded in the computer document 252, the security application 108n and/or 112 (see FIG. 1) may detect that the embedded executable code 254 is malicious by detecting the hoax object 256 in the computer document 252 that includes the message 264 enticing the user to select the "Enable All Features" button 212 in order to enable execution of the malicious embedded executable code 254. The security application 108n and/or 112 (see FIG. 1) may then perform, in response to detection of the hoax object 256, a security action on the network device 104n (see FIG. 1) that secures the network device 104n from the malicious embedded executable code 254. The protection of the network device 104n (see FIG. 1) from the malicious embedded executable code 254 that is embedded in the computer document 252 is disclosed in greater detail in connection with FIG. 3 herein.

Modifications, additions, or omissions may be made to the document applications 200 and 250, the computer documents 202 and 252, and the hoax objects 206 and 256 of FIGS. 2A and 2B without departing from the scope of the present disclosure. For example, although the document applications 200 and 250 are disclosed herein as presenting prompts 208 and 258 in a menu bar, similar prompts may instead be presented to a user in a pop-up window or settings window of the document applications 200 and 250. Further, in some embodiments, the document applications 200 and 250 and/or the computer documents 202 and 252 may include additional components similar to the components illustrated in FIGS. 2A and 2B that each may be configured similarly to the components illustrated in FIGS. 2A and 2B.

Figure 3:
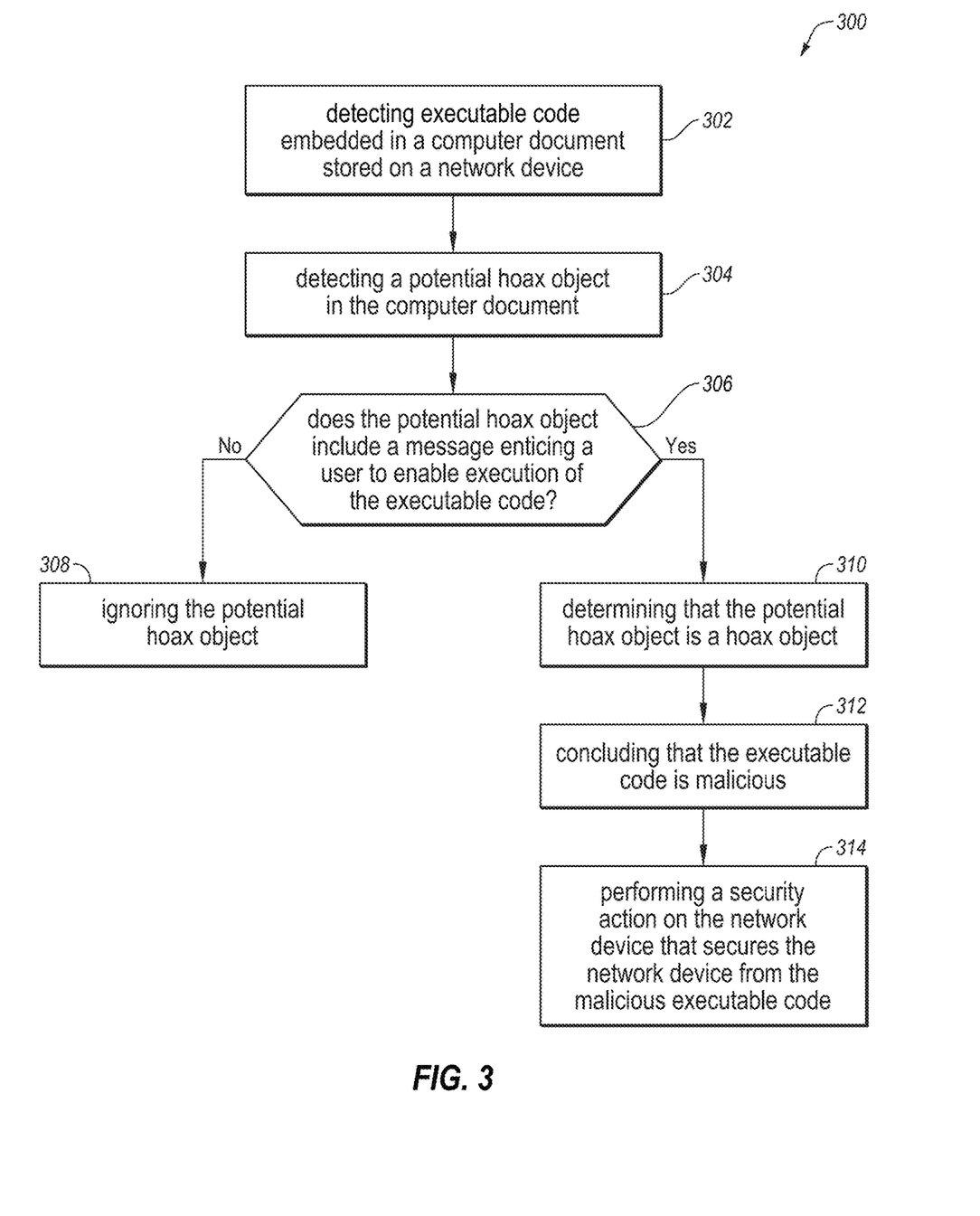
FIG. 3 is a flowchart of an example method for protecting a network device from malicious executable code embedded in a computer document.

FIG. 3 is a flowchart of an example method 300 for protecting a network device from malicious executable code embedded in a computer document. The method 300 may be performed, in some embodiments, by a device or system, such as by one or more of the security applications 108a-108n executing on the network devices 104a-104n, respectively and the security application 112 executing on the security server 106 of FIG. 1. In these and other embodiments, the method 300 may be performed by one or more processors based on one or more computer-readable instructions stored on one or more non-transitory computer-readable media. The method 300 will now be described in connection with FIGS. 1, 2A, 2B, and 3.

The method 300 may include, at action 302, detecting executable code embedded in a computer document stored on a network device. In some embodiments, the computer document may be a Microsoft® Office computer document and the executable code embedded in the Microsoft® Office computer document may be Visual Basic for Applications (VBA) executable code (i.e., a "Macro"). In some embodiments, the computer document may be a Portable Document Format (PDF) computer document and the executable code embedded in the PDF computer document may be JavaScript executable code. In some embodiments, the detecting, at action 302, may be performed in response to the loading of the computer document into a corresponding document application. For example, the security application 108a and/or the security application 112 may detect, at action 302, the embedded executable code 204 (e.g., VBA executable code) that is embedded in the computer document 202 (e.g., a Microsoft® Word computer document) stored on the network device 104a, in response to the loading of the computer document 202 into the document application 200 (e.g., Microsoft® Word). In another example, the security application 108n and/or the security application 112 may detect, at action 302, the embedded executable code 254 (e.g., JavaScript executable code) that is embedded in the computer document 252 (e.g., a PDF computer document) stored on the network device 104b, in response to the loading of the computer document 252 into the document application 250 (e.g., Adobe® Acrobat® Reader).

The method 300 may include, at action 304, detecting a potential hoax object in the computer document. For example, the security application 108a and/or the security application 112 may detect, at action 304, the hoax object 206 in the computer document 202 (e.g., a Microsoft® Word computer document) as a potential hoax object. In another example, the security application 108n and/or the security application 112 may detect, at action 304, the hoax object 256 in the computer document 252 (e.g., a PDF computer document) as a potential hoax object.

The method 300 may include, at action 306, determining whether the potential hoax object includes a message enticing a user to enable execution of the executable code. If not (No at action 306), the method may proceed to action 308. If so (Yes at action 306), the method may proceed to actions 310, 312, and 314.

In some embodiments, the potential hoax object may be a text object. In these embodiments, the determining, at action 306, whether the potential hoax object is a hoax object may be performed by searching through text in the text object to identify a word or phrase that indicates that the text object includes a message enticing a user to enable execution of the executable code. For example, the security application 108a and/or the security application 112 may determine, at action 306, whether the hoax object 206 (which is a text object and was identified as a potential hoax object at action 304) is a hoax object by searching through the text message 214 in the hoax object 206 (i.e., the text message 214 that reads "Contents of this document are protected. To view this content, please click 'Enable Content' from the yellow bar above") to identify a word or phrase that indicates that the hoax object 206 includes a message enticing a user to enable execution of the embedded executable code 204 (e.g., such as searching for the phrase "Enable Content").

In some embodiments, the potential hoax object may be an image object. In embodiments where the potential hoax object is an image object, the determining, at action 306, whether the potential hoax object is a hoax object may be performed by generating a hash of the image object and determining that the hash of the image object matches a hash of a known hoax object. In these embodiments, a known hoax object may be a hoax object that was identified previously in another computer document. In these embodiments, the determining that the hash of the image object matches the hash of the known hoax object may include determining that the hash of the image object matches the hash of the known hoax object using fuzzy matching. In these embodiments, the hash of the image object may be a fuzzy hash, the hash of the known hoax object may also be a fuzzy hash, and the determining that the fuzzy hash of the image object matches the fuzzy hash of the known hoax object may include determining that the fuzzy hash of the image object matches the fuzzy hash of the known hoax object at or above a threshold matching percentage. In these embodiments, the determining that the hash of the image object matches the hash of the known hoax object may include determining that the hash of the image object matches the hash of the known hoax object using a cyclic redundancy check (CRC) to generate the hash of the image object and the hash of the known hoax object. For example, the security application 108n and/or the security application 112 may determine, at action 306, whether the hoax object 256 (which is an image object and was identified as a potential hoax object at action 304) is a hoax object by generating a hash of the hoax object 256 and determining that the hash of the hoax object 256 matches a hash of a known hoax object using fuzzy hashes, fuzzy matching, a threshold matching percentage, or a CRC, or some combination thereof.

Alternatively, in embodiments where the potential hoax object is an image object, the determining, at action 306, whether the potential hoax object is a hoax object may be performed by processing the image object to extract text present in the image object and searching through the extracted text to identify a word or phrase that indicates that the extracted text includes a message enticing a user to enable execution of the executable code. For example, the security application 108n and/or the security application 112 may determine, at action 306, whether the hoax object 256 (which is an image object and was identified as a potential hoax object at action 304) is a hoax object by processing the hoax object 256 to extract the text message 264 present in the image of the hoax object 256 (i.e., the text message 264 that reads "To view the below encrypted content, please click the button present in the uppermost corner of the page labeled 'Enable All Features'") and searching through the extracted text to identify a word or phrase that indicates that the extracted text includes a message enticing a user to enable execution of the embedded executable code 254 (such as the phrase "Enable All Features").

The method 300 may include, at action 308, ignoring the potential hoax object. For example, the security application 108a, the security application 108n, or the security application 112 may ignore, at action 308, a potential hoax object in a computer document where the potential hoax object cannot be determined to include a message enticing a user to enable execution of the executable code in the computer document.

The method 300 may include, at action 310, determining that the potential hoax object is a hoax object. For example, the security application 108a and/or the security application 112 may determine, at action 310, that the hoax object 206 (which was identified as a potential hoax object at action 304) in the computer document 202 (e.g., a Microsoft® Word computer document) is a hoax object, in response to the determination made at action 306. In another example, the security application 108*n* and/or the security application 112 may detect, at action 310, that the hoax object 256 (which was identified as a potential hoax object at action 304) in the computer document 252 (e.g., a PDF computer document) is a hoax object, in response to the determination made at action 306.

The method 300 may include, at action 312, concluding that the executable code is malicious. For example, the security application 108*a* and/or the security application 112 may determine, at action 312, that the embedded executable code 204 (e.g., VBA executable code) is malicious, in response to the determination(s) made at action 306 and/or action 310. In another example, the security application 108*n* and/or the security application 112 may determine, at action 312, that the embedded executable code 254 (e.g., JavaScript executable code) is malicious, in response to the determination(s) made at action 306 and/or action 310.

The method 300 may include, at action 314, performing a security action on the network device that secures the network device from the malicious executable code. In some embodiments, the performing of the security action on the network device may include quarantining the executable code and/or quarantining the computer document and/or ceasing the execution of the executable code. For example, the security application 108*a* and/or the security application 112 may perform, at action 314, a security action (such as quarantining the embedded executable code 204 and/or quarantining the computer document 202 and/or ceasing the execution of the embedded executable code 204) on the network device 104*a* to protect the network device 104*a* from the malicious embedded executable code 204 (e.g., VBA executable code), in response to the determination(s) made at action 306, action 310, and/or action 312. In another example, the security application 108*n* and/or the security application 112 may perform, at action 314, a security action (such as quarantining the embedded executable code 254 and/or quarantining the computer document 252 and/or ceasing the execution of the embedded executable code 254) on the network device 104*n* to protect the network device 104*n* from the malicious embedded executable code 254 (e.g., JavaScript executable code), in response to the determination(s) made at action 306, action 310, and/or action 312.

The method 300 may thus be employed, in some embodiments, to protect a network device (e.g., the network device 104*a* or 104*n*) from malicious executable code that is embedded in a computer document (e.g., the malicious embedded executable code 204 or 254). Some embodiments of the method 300 may enable a computer document (e.g., the computer document 202 or 252) to reap the benefits of embedding executable code while safely handling the situation where any given executable code turns out to be malicious.

Although the actions of the method 300 are illustrated in FIG. 3 as discrete actions, various actions may be divided into additional actions, combined into fewer actions, reordered, expanded, or eliminated, depending on the desired implementation. For example, in some embodiments, actions 304, 306, and 312 may be employed without performing the other actions of the method 300. Also, in some embodiments, actions 302, 304, 306, and 310, 312, and 314 may be employed without performing the other actions of the method 300. Also, in some embodiments, any of actions 302 and 314 may be performed by a document application, network administrator, or other entity that is different from the entity performing the other actions of the method 300.

Further, it is understood that the method 300 may improve the functioning of a network environment. For example, the functioning of any of the network devices 104*a*-104*n* of FIG. 1 may itself be improved by the method 300. For example, any of these computer systems may be improved by performing, in response to detection of a hoax object in a computer document, a security action on a network device that secures the network device from malicious executable code that is embedded in the computer document, such as quarantining the executable code and/or quarantining the computer document and/or ceasing the execution of the executable code. The method 300 may thus result in the protection of any of the network devices 104*a*-104*n* from malicious embedded executable code to reap the benefits of embedding executable code in computer documents while safely handling the situation where the embedded executable code turns out to be malicious. The method 300 may be more effective than conventional methods which fail to detect a hoax object in a computer document and fail to appreciate that the presence of a hoax object in a computer document is an indicator that the executable code that is embedded in the computer document is malicious.

Also, the method 300 may improve the technical field of securing network devices. Accurately identifying and securely dealing with malicious embedded executable code in a computer document is an improvement over conventional methods which are unable to accurately identify or securely deal with malicious embedded executable code due to failing to take into account the significance of a hoax object in a computer document.

FIG. 4 illustrates an example computer system 400 that may be employed in protecting a network device from malicious executable code embedded in a computer document. In some embodiments, the computer system 400 may be part of any of the systems or devices described in this disclosure. For example, the computer system 400 may be part of any of the network devices 104*a*-104*n*, the security server 106, and the third-party server 110 of FIG. 1.

The computer system 400 may include a processor 402, a memory 404, a file system 406, a communication unit 408, an operating system 410, a user interface 412, and a module 414, which all may be communicatively coupled. In some embodiments, the computer system may be, for example, a desktop computer, a client computer, a server computer, a mobile phone, a laptop computer, a smartphone, a smartwatch, a tablet computer, a portable music player, or any other computer system.

Generally, the processor 402 may include any suitable special-purpose or general-purpose computer, computing entity, or processing device including various computer hardware or software modules and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 402 may interpret and/or execute program instructions and/or process data stored in the memory 404 and/or the file system 406. In some embodiments, the processor 402 may fetch program instructions from the file system 406 and load the program instructions into the memory 404. After the program instructions are loaded into the memory 404, the processor 402 may execute the program instructions. In some embodiments, the instructions may include the processor 402 performing one or more of the actions of the method 300 of FIG. 3.

The memory 404 and the file system 406 may include computer-readable storage media for carrying or having stored thereon computer-executable instructions or data structures. Such computer-readable storage media may be any available non-transitory media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more of the actions of the method 300 of FIG. 3. These computer-executable instructions may be included, for example, in the operating system 410, in one or more applications, such as the security applications 108a-108n and 112 and the document applications 200 and 250, or in some combination thereof.

The communication unit 408 may include any component, device, system, or combination thereof configured to transmit or receive information over a network, such as the network 102 of FIG. 1. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 408 may permit data to be exchanged with a network and/or any other devices or systems, such as those described in the present disclosure.

The operating system 410 may be configured to manage hardware and software resources of the computer system 400 and configured to provide common services for the computer system 400.

The user interface 412 may include any device configured to allow a user to interface with the computer system 400. For example, the user interface 412 may include a display, such as an LCD, LED, or other display, that is configured to present video, text, application user interfaces, and other data as directed by the processor 402. The user interface 412 may further include a mouse, a track pad, a keyboard, a touchscreen, volume controls, other buttons, a speaker, a microphone, a camera, any peripheral device, or other input or output device. The user interface 412 may receive input from a user and provide the input to the processor 402. Similarly, the user interface 412 may present output to a user.

The module 414 may be one or more computer-readable instructions stored on one or more non-transitory computer-readable media, such as the memory 404 or the file system 406, that, when executed by the processor 402, is configured to perform one or more of the actions of the method 300 of FIG. 3. In some embodiments, the module 414 may be part of the operating system 410 or may be part of an application of the computer system 400, or may be some combination thereof. In some embodiments, the module 414 may function as any one of the security applications 108a-108n and 112 and the document applications 200 and 250 of FIG. 1.

Modifications, additions, or omissions may be made to the computer system 400 without departing from the scope of the present disclosure. For example, although each is illustrated as a single component in FIG. 4, any of the components 402-414 of the computer system 400 may include multiple similar components that function collectively and are communicatively coupled. Further, although illustrated as a single computer system, it is understood that the computer system 400 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 402 of FIG. 4) including various computer hardware or software modules, as discussed in greater detail below. Further, as indicated above, embodiments described herein may be implemented using computer-readable media (e.g., the memory 404 or file system 406 of FIG. 4) for carrying or having computer-executable instructions or data structures stored thereon.

In some embodiments, the different components and modules described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an"

limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for protecting a network device from malicious executable code embedded in a computer document, at least a portion of the method being performed by a computing device comprising one or more processors, the method comprising:
   detecting executable code embedded in the computer document stored on the network device wherein the computer document is an Office document or a Portable Document Format (PDF) computer document;
   detecting a potential hoax object in the computer document;
   determining that the potential hoax object is a hoax object by determining that the potential hoax object includes a message enticing a user to enable execution of the executable code; and
   in response to determining that the potential hoax object is a hoax object, concluding that the executable code is malicious and performing a security action on the network device that secures the network device from the malicious executable code.

2. The method of claim 1, wherein:
the executable code embedded in the Office computer document is Visual Basic for Applications (VBA) executable code.

3. The method of claim 1, wherein:
the executable code embedded in the PDF computer document is JavaScript executable code.

4. The method of claim 1, wherein the potential hoax object is a text object.

5. The method of claim 1,
wherein the potential hoax object is an image object; and
determining that the potential hoax object includes the message enticing the user to enable execution of the executable code comprises processing the image object to extract text present in the image object and searching through the extracted text to identify a word or phrase that indicates that the extracted text includes the message enticing the user to enable execution of the executable code.

6. The method of claim 1, wherein the performing of the security action on the network device comprises quarantining the executable code and/or quarantining the computer document.

7. The method of claim 1, wherein the performing of the security action on the network device comprises ceasing the execution of the executable code.

8. A computer-implemented method for protecting a network device from malicious executable code embedded in a computer document, at least a portion of the method being performed by a computing device comprising one or more processors, the method comprising:
   detecting executable code embedded in the computer document stored on the network device wherein the computer document is an Office document or a Portable Document Format (PDF) computer document;
   detecting a potential hoax object in the computer document, the potential hoax object comprising a text object;
   determining that the potential hoax object is a hoax object by searching through text in the text object to identify a word or phrase that indicates that the text object includes a message enticing a user to enable execution of the executable code; and
   in response to determining that the potential hoax object is a hoax object, concluding that the executable code is malicious and performing a security action on the network device that secures the network device from the malicious executable code.

9. The method of claim 8, wherein:
the executable code embedded in the Office computer document is Visual Basic for Applications (VBA) executable code; and
the identified phrase is or includes the phrase "enable content".

10. The method of claim 8, wherein:
the executable code embedded in the PDF computer document is JavaScript executable code; and
the identified phrase is or includes the phrase "enable all features".

11. The method of claim 8, wherein the performing of the security action on the network device comprises quarantining the executable code and/or quarantining the computer document.

12. The method of claim 8, wherein the performing of the security action on the network device comprises ceasing the execution of the executable code.

13. A computer-implemented method for protecting a network device from malicious executable code embedded in a computer document, at least a portion of the method being performed by a computing device comprising one or more processors, the method comprising:
detecting executable code embedded in the computer document stored on the network device wherein the computer document is an Office document or a Portable Document Format (PDF) computer document;
detecting a potential hoax object in the computer document, the potential hoax object comprising an image object;
determining that the potential hoax object is a hoax object by one or more of: generating a hash of the image object and determining that the hash of the image object matches a hash of a known hoax object; and processing the image object to extract text present in the image object and searching through the extracted text to identify a vlord or phrase that indicates that the extracted text includes a message enticing a user to enable execution of the executable code; and
in response to determining that the potential hoax object is a hoax object, concluding that the executable code is malicious and performing a security action on the network device that secures the network device from the malicious executable code.

14. The method of claim 13, wherein:
the executable code embedded in the Office computer document is Visual Basic for the identified phrase is or includes the phrase "enable content".

15. The method of claim 13 wherein:
the executable code embedded in the PDF computer document is JavaScript executable code; and
the identified phrase is or includes the phrase "enable all features".

16. The method of claim 13, wherein the performing of the security action on the network device comprises quarantining the executable code and/or quarantining the computer document.

17. The method of claim 13, wherein the performing of the security action on the network device comprises ceasing the execution of the executable code.

18. The method of claim 13, wherein the determining that the hash of the image object matches the hash of the known hoax object comprises determining that the hash of the image object matches the hash of the known hoax object using fuzzy matching.

19. The method of claim 13,
wherein: the hash of the image object is a fuzzy hash;
the hash of the known hoax object is also a fuzzy hash; and
the determining that the fuzzy hash of the image object matches the fuzzy hash of the known hoax object comprises determining that the fuzzy hash of the image object matches the fuzzy hash of the known hoax object at or above a threshold matching percentage.

20. The method of claim 13, wherein the determining that the hash of the image object matches the hash of the known hoax object comprises determining that the hash of the image object matches the hash of the known hoax object using a cyclic redundancy check (CRC) to generate the hash of the image object and the hash of the known hoax object.

* * * * *